L. R. TEEPLE.
THERMOSTATIC CONTROL DEVICE.
APPLICATION FILED AUG. 9, 1917.
1,304,822.
Patented May 27, 1919.
3 SHEETS—SHEET 1.
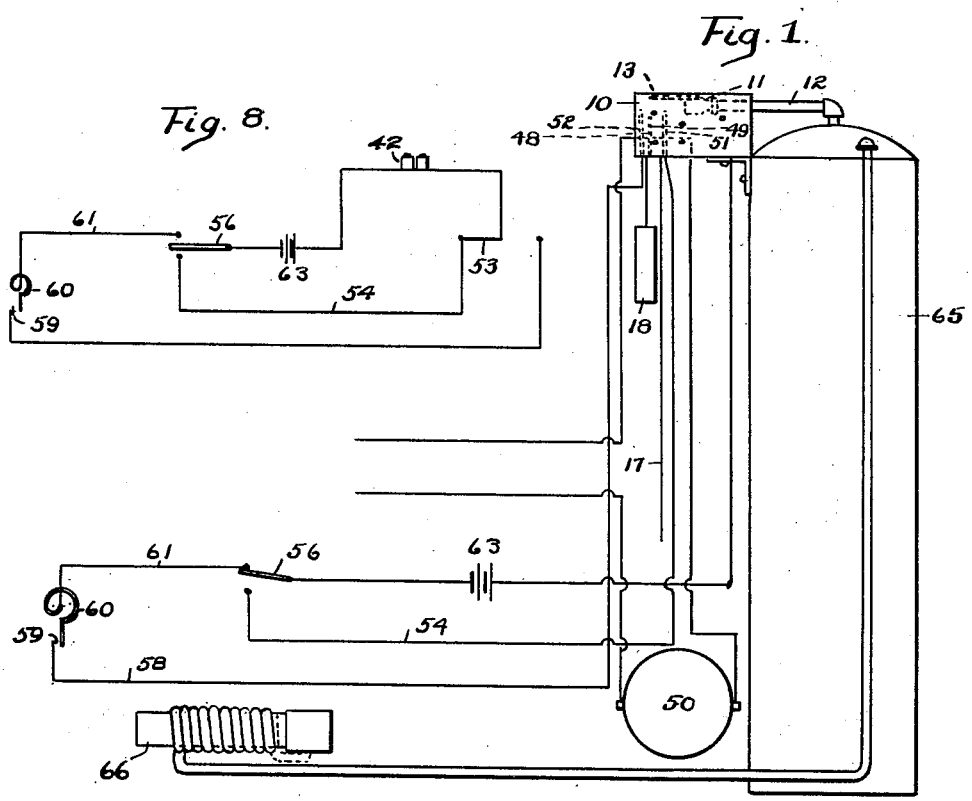
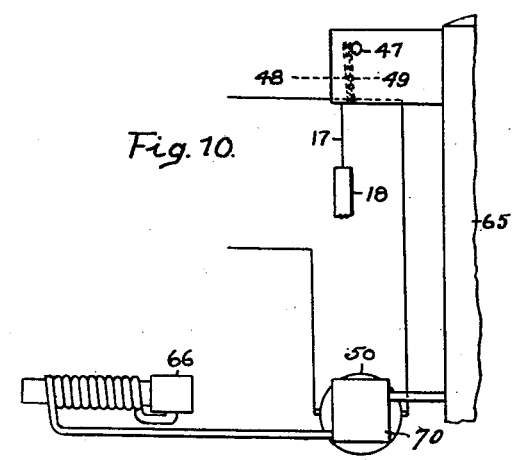
INVENTOR.
Lawrence R. Teeple
BY Taylor & Hulse
ATTORNEYS.

L. R. TEEPLE.
THERMOSTATIC CONTROL DEVICE.
APPLICATION FILED AUG. 9, 1917.

1,304,822.

Patented May 27, 1919.

Lawrence R. Teeple
Inventor
by Taylor & Hulse
Attorneys.

L. R. TEEPLE.
THERMOSTATIC CONTROL DEVICE.
APPLICATION FILED AUG. 9, 1917.
1,304,822.
Patented May 27, 1919.
3 SHEETS—SHEET 3.
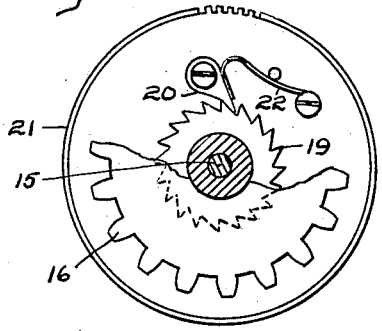
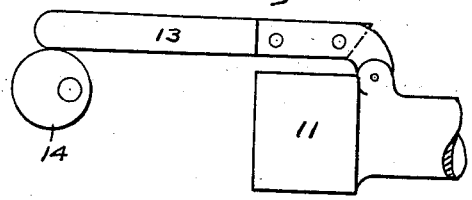
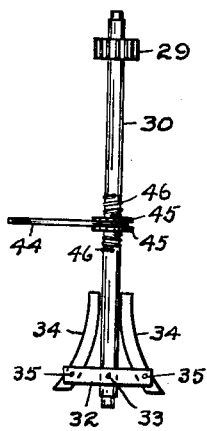
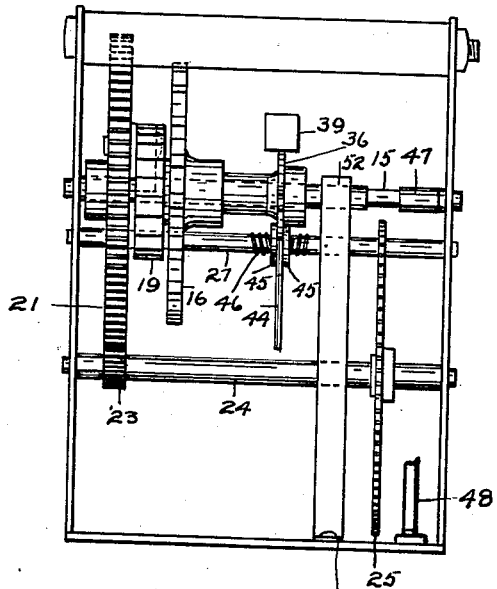
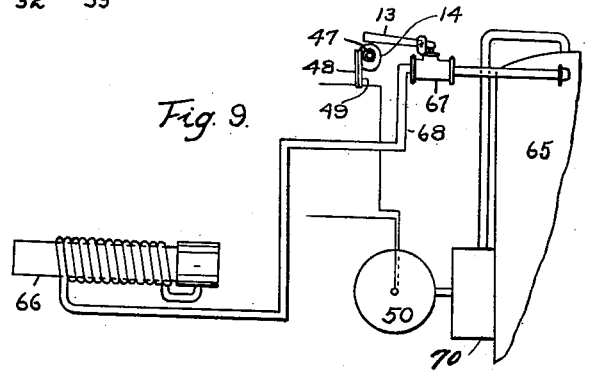
Lawrence R. Teeple
Inventor
by Taylor & Huls
Attorneys.

UNITED STATES PATENT OFFICE.

LAWRENCE R. TEEPLE, OF FORT WAYNE, INDIANA.

THERMOSTATIC-CONTROL DEVICE.

1,304,822.　　　　Specification of Letters Patent.　　Patented May 27, 1919.

Application filed August 9, 1917. Serial No. 185,371.

*To all whom it may concern:*

Be it known that I, LAWRENCE R. TEEPLE, a citizen of the United States, residing at Fort Wayne, in the county of Allen and State of Indiana, have invented new and useful Improvements in Thermostatic-Control Devices, of which the following is a specification.

The invention relates to devices controlled by a thermostat for operating valves and electrical switches.

In systems involving the use of liquid fuel under pressure for generating heat it is essential to control the flow of the fuel to the device where it is ignited or where it is converted into a vapor and the vapor ignited, so that the flow of the fuel shall be stopped in case the flame at the combusting point of the device shall be unintentionally extinguished.

The object of the invention is to provide a simple and effective device controlled by a thermostat which shall automatically actuate a valve to either cut-off the oil supply to the device or vent the air under pressure on the fuel in its storage tank when the temperature in the vicinity of the thermostat falls below a predetermined point. Another object is to provide the device with means which shall automatically cut-out the pump which pumps the fuel or supplies air under pressure to the fuel storage tank.

In the drawings, which illustrate an embodiment of the invention, Figure 1 is an elevational view of the device connected to an oil burning system.

Fig. 4 is a sectional view on the line 4—4 of Fig. 2.

Fig. 5 is an end elevational view of the mechanism, the sprocket wheel having been rotated a quarter turn from the position shown in Figs. 2 and 3.

Fig. 6 is a plan view of the governor.

Fig. 7 is a side elevational view of the valve lever and operating cam.

Fig. 8 is a diagrammatic view showing the electrical circuits.

Fig. 9 is a modification showing the controlling mechanism and valve applied to cut-off the supply of oil to the combusting device.

Fig. 10 is a modification showing the controlling mechanism applied to cut-out the pump where the latter pumps the fuel direct to the burner or generator.

Figure 2:
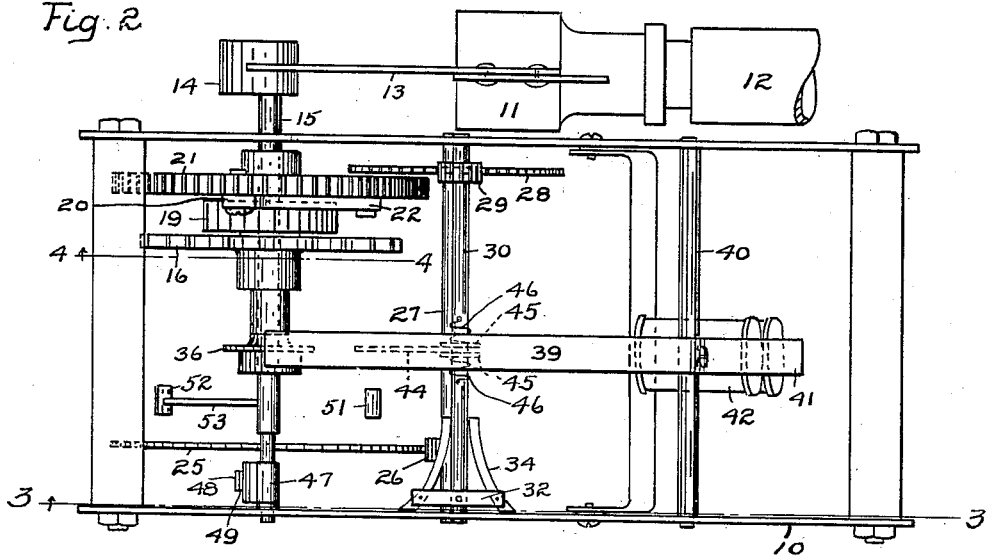
Fig. 2 is a plan view of the controlling mechanism.
Figure 3:
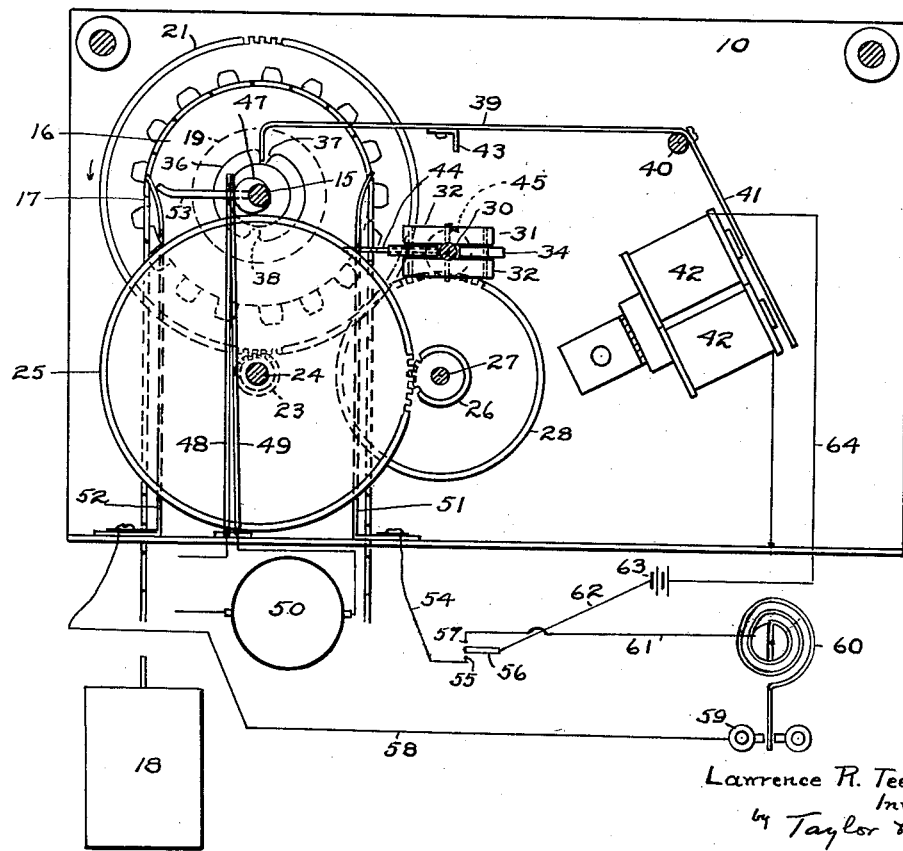
Fig. 3 is a sectional view on line 3—3 of Fig. 2.

Referring to the drawings, 10 is a suitable frame which supports the valve operating mechanism, the valve 11, Figs. 1, 2 and 3, being connected by pipe 12 to tank 65 containing the liquid fuel and air under pressure, the air being supplied by a suitable pump driven by motor 50. Valve 11 is adapted to release the air from the tank. In Fig. 9, valve 67 is adapted to shut off the flow of fuel through pipe 68 leading from tank 65 to the burner or generator 66. In both figures lever 13 is connected to the valve for properly operating it and the free end of the lever rides on a cam 14 secured to shaft 15 borne in frame 10. Chain sprocket wheel 16 is loose on shaft 15 and chain 17 carrying weight 18 is engaged on wheel 16. Ratchet wheel 19 is secured to or integral with sprocket wheel 16 and pawl 20 pivoted on gear 21 secured to shaft 15 engages the ratchet. Spring 22 tends to retain the engagement of the pawl and ratchet. Gear wheel 21 meshes with pinion 23 on shaft 24 and gear 25 secured to shaft 24 meshes with pinion 26 secured to shaft 27. Gear wheel 28 secured to shaft 27 meshes with pinion 29 secured to governor shaft 30. The governor 31 may be any well known type. The device illustrated consists of two members or bars 32 secured to opposite sides of shaft 30 by pin 33. Between the opposite ends of members 32 are secured two rods or arms 34 which are pivoted respectively to members 32 at 35.

A circular disk 36, having two notches 37, 38 at diametrically opposite points in its periphery, is secured to shaft 15 and pawl 39 secured to rocker shaft 40 rides on the peripheral edge of the disk and drops by gravity into notch 37 or 38 when it comes beneath the pawl as shaft 15 rotates. This pawl, therefore, locks the shaft 15 from further rotation. Lever 41, which is preferably integral with pawl 39, serves as an armature for electro-magnets 42, which magnets when energized attract lever 41 to cause pawl 39 to release disk 36 and permit shaft 15 to rotate under the influence of weight 18.

Lug or stop 43 depends from pawl 39 and trip 44 is adapted to abut the lug and stop the operation of the clock-work mechanism when shaft 15 has made a half-revolution and pawl 39 has dropped into the notch on disk 36. The trip 44 is held between two loose disks 45 on shaft 30 which are forced toward each other by springs 46 secured at one end respectively to shaft 30. The trip is, therefore, resiliently secured to the shaft and permits of the gradual stoppage of the clock-work mechanism.

Cam 47 is secured to shaft 15 and is adapted to close contacts 48, 49 which form terminals of an electrical circuit to electric motor 50 which motor drives a pump 70 (Figs. 9 and 10). In Fig. 9 the pump is connected to pump air into the storage tank 65 and in Fig. 10 the pump pumps fuel from the storage tank directly to the burner or generator 66. Cam 47 closes the contacts only while pawl 39 is engaged in a notch in the disk. In Fig. 3, the cam must be in notch 37 in order that cam 47 will close contacts 48, 49.

Two posts or contacts 51, 52 are suitably arranged to be abutted by brush or contact 53 secured to shaft 15. Post 51 is connected by wire 54 to terminal 55 of switch 56 and post 52 is connected by wire 58 to terminal post 59 on thermostat 60. Wire 61 connects the thermostatic element to contact 57 of switch 56. The switch arm is connected by wire 62 to one side of battery 63 and the opposite side of the battery is connected by wire 64 to electro-magnets 42. Frame 10 completes the circuit between the electro-magnet and brush or contact 53 since they are grounded on the frame.

The thermostat is designed to be installed within or near the furnace or other appliance which the burner is heating, and its element is of a nature to make contact with post 59 upon the lowering of the temperature of the heated appliance, so that if for any reason the combusting vapor or oil is extinguished the air under pressure in the storage tank will be released and the air pump stopped to check the flow of fuel to the burner, or the flow of the oil is itself cut off and the pump stopped.

In operation and starting with valve 11 in the inoperative position, pawl 39 is engaged in notch 37 in disk 36, contact 53 is in engagement with contact 52, cam 47 has closed contacts 48, 49, trip 44 is out of contact with the lug 43, switch 56 is closed on terminal 57 and the electro-magnets are deenergized. When the temperature about the thermostat falls below the predetermined degree, its element closes on contact 59 and current flows from the battery through the electro-magnets, frame 10, contact 53, post 52, the thermostat, switch 56 and back to the battery. The electro-magnets are, therefore, energized and pawl 39 is disengaged from notch 37 permitting the weight to descend for rotating shaft 15 and cams 14 and 47 and driving the clock-work and the governor. Cam 14 actuates the valve to release the air under pressure or to cut off the supply of oil and cam 47 permits contacts 48, 49 to separate and break the electrical circuit to the air pump motor. When shaft 15 has made a half-revolution contact 53 meets post 51 and since post 51 is connected to terminal 55 of switch 56 and the arm of the switch is in contact with terminal 57, no current flows from the battery to electro-magnets 42, the circuit to the electro-magnets having been broken upon the disengagement of contact 53 and post 52. By this time notch 38 has come beneath pawl 39 and it drops down into the notch, and stop 43 which depends from the pawl, descends into the path of trip 44 which is rotated by shaft 30 from left to right (Fig. 3), and the trip abuts the stop at substantially the moment the pawl engages a notch in cam 36. Since the trip is resiliently secured to shaft 30 it will, upon abutting the stop, give more or less and serve as a brake to the clock-work mechanism and cause it to stop gradually. The clock-work mechanism, if caused to stop by pawl 39 alone, would overrun more or less and thereby become strained at each operation of the device, and it is to avoid this straining of the mechanism that the trip and stop are employed. The engagement of the pawl and cam 36 and of the trip and stop cause the entire mechanism to come to rest with cam 14 retaining lever 13 in elevated position so that valve 11 continues to release the air under pressure or to cut off the supply of fuel. The operator then throws switch 56 onto contact 55 and current then flows from the battery through the electro-magnets, frame 10, contact 53, post 51, switch 56 and back to the battery. The electro-magnets are again energized and pawl 39 is released from notch 38 to permit shaft 15 and the cams to rotate, cam 14 releasing valve 11 and cam 47 closing the motor circuit. The parts continue their movement until notch 37 passes beneath pawl 39 whereupon the pawl drops into it and further movement of the shaft is stopped. Contact 53 is now in engagement with post 52 and the operator throws switch 56 into contact with post 57, and the device is ready for a subsequent operation.

In this manner the flow of the fuel to the burner or vaporizer is automatically cut off and all flooding of the fuel in the heated appliance or the burner is obviated.

The function of the clock-work mechanism is to drive the trip 44 and the governor and to cause the weight 18 to descend at a constant speed when the pawl 39 is released from engagement with cam 36 by electro-magnets 42.

In Fig. 9, the valve 67 being placed in the oil supply line which leads from the tank to the burner or generator stops the flow of oil to the latter when the thermostat closes the electrical circuit to the electro-magnets and the clock-work mechanism is released to cause cam 14 to operate the valve.

In Fig. 10 the pump is pumping the fuel directly from a storage tank to the burner or generator hence in case the flame at the latter is inadvertently extinguished the thermostat acts as before and the clock-work mechanism causes cam 47 to break the electrical circuit to the motor at terminals 48, 49. When the motor stops of course the pump which it drives ceases to pump fuel to the burner or generator and no harm results from the extinguishment of the flame.

What I claim is:

1. In combination an electric motor-driven pump, an electrical circuit for the motor having two normally open terminals therein, means to close the said circuit at said terminals, means to lock the latter means in the closing position thereof, electrically actuated means to release the locking means, and a thermostat to control the operation of the electrically actuated means.

2. In combination an electric motor-driven pump, a reservoir for fuel having a connection to the pump, for causing the fuel to be forced out of the reservoir, a valve to control the flow of the fuel from the reservoir, an electrical circuit for the motor having two normally open terminals therein, means to close the circuit at said terminals, means to actuate the valve means to lock both said circuit closing means and said valve actuating means, and electrically operated means to release the said lock whereby the said circuit is opened and the said valve is actuated to cut off the flow of fuel from the reservoir, and a thermostat to control the said electrically operated means.

3. In combination a reservoir for fuel, means connected to the reservoir for combusting the fuel, a valve to control the flow of fuel from the reservoir, an electric motor-driven pump for forcing the fuel from the reservoir, an electrical circuit for the motor having two normally open terminals therein, means to close the said circuit at said terminals, means to lock the said circuit closing means in closed position, means to actuate the valve for cutting off the flow of fuel from the reservoir, electrically actuated means to release the lock to cause the circuit closing means to open said circuit and to cause the valve to be operated to cut off the flow of fuel from the reservoir to the means for combusting the fuel, a thermostat to control the electrically actuated means, and a clock work mechanism having driving connection with the circuit closing means and the valve actuating means.

4. In combination a reservoir for fuel, a valve to control the flow of fuel therefrom, an electric motor-driven pump for forcing the fuel from the reservoir, an electrical circuit for the motor having two normally open terminals therein, a revoluble shaft, a contact on the shaft adapted to close the said circuit at said terminals, a cam on the shaft adapted to actuate the valve for shutting off the flow of fuel from the reservoir, a clock work mechanism having connection with the shaft for driving it, means to lock the shaft, electrically actuated means to release the lock and a thermostat to control the electrically actuated means.

In witness whereof I hereunto subscribe my name this 29th day of July, 1917.

LAWRENCE R. TEEPLE.